May 10, 1927.  
E. F. DONNELLY  
1,627,840  
VACUUM VALVE  
Filed Aug. 31, 1925

Inventor:  
Edward F. Donnelly.  
by his atty.  
Charles S. Gooding.

Patented May 10, 1927.

1,627,840

UNITED STATES PATENT OFFICE.

EDWARD F. DONNELLY, OF MALDEN, MASSACHUSETTS.

VACUUM VALVE.

Application filed August 31, 1925. Serial No. 53,461.

This invention relates to a vacuum valve, and has for its object to provide a valve capable of operating automatically to relieve the vacuum that is often formed in hot-water tanks, radiators and the like.

It is still further an object of the invention to provide a valve of the character mentioned having a movable valve member which will not have a tendency to stick and which will open and close quickly without the use of springs, said valve being equally effective when employed in connection with either water, steam or compressed air.

The invention consists in a vacuum valve as set forth in the following specification and particularly as pointed out in the claim thereof.

Referring to the drawings:—

Like numerals refer to like parts throughout the several views of the drawings.

Figure 1:
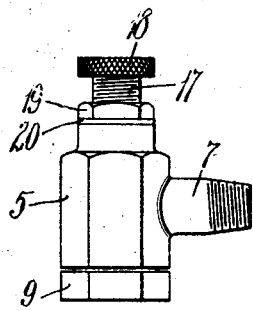
Figure 1 represents a side elevation of a vacuum valve embodying my invention.

In the drawings, 5 represents a valve casing provided with a chamber 6 in the interior thereof, and said casing has an externally threaded arm 7 formed integral therewith having a fluid inlet passage 8 extending therethrough and communciating with the chamber 6.

Figure 2:
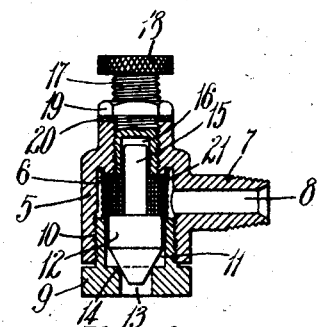
Fig. 2 is a central vertical section through the valve.

A sleeve 9 is detachably mounted in the casing 5 having screw-threaded engagement therewith at 10 and said sleeve has a recess 11 formed therein, in which a movable valve member 12 is loosely mounted. The sleeve 9 has an air inlet port 13 formed therein which communicates with the recess 11. The sleeve 9 also has a valve seat 14 formed thereon and the movable valve member 12 in its normal position, as illustrated in Fig. 2, is seated against said seat 14, thereby closing the port 13.

The movable valve member 12 has a stem portion 15 formed integral therewith and the latter is located within a recess 16 of an adjusting screw 17, the latter acting as a guide for said stem portion 15 and also limiting the movement of said movable valve member within the sleeve 9 and the casing 5. The adjusting screw 17 is provided with a knurled head 18 and has a check nut 19 and washer 20 associated therewith, said check nut being provided for the purpose of preventing the adjusting screw 17 from being moved accidentally, and the washer 20 being provided for the purpose of preventing leakage around the screw threads of the adjusting screw.

A screen 21, preferably constructed of fine mesh wire, is provided within the chamber 6, being interposed between the fluid inlet passage 8 and the movable valve member 12, and one end of said screen engages the inner extremity of the sleeve 9, while the other extremity of said screen engages the end of the chamber 6 opposite said sleeve. The screen 21 is provided for the purpose of preventing impurities and particles of dirt that may enter the chamber 6 through the passage 8 from being deposited within the recess 11 of the sleeve 9 and around the movable valve member 12.

In its operation, pressure within the system, of which the valve forms a part, enters the chamber 6 of said valve through the passage 8 and acts upon the movable valve member 12 to hold the latter seated and the port 13 closed. If for any reason the pressure within the system is reduced below the pressure of the atmosphere upon the exterior thereof, the atmospheric pressure entering the port 13 will force the movable valve member 12 away from its seat 14 and air will enter the valve and will relieve the vacuum in the system. As soon as the pressure within the system becomes equal to or greater than the atmospheric pressure upon the exterior thereof, the movable valve member will automatically close the port 13.

The extent to which the movable valve member 12 may move within the valve may be varied by manipulating the adjusting screw 17.

The screen 21 effectively prevents impurities and particles of sand and other foreign matter within the system from coming in contact with the movable valve member 12 and particularly from entering the recesses 11 and 16 around said movable valve member 12 thereby preventing said valve member from becoming clogged within the valve.

I claim:—

A vacuum valve comprising, in combination, a casing provided with a fluid inlet passage communicating with the interior thereof, a sleeve detachably mounted in said casing and provided with a recess therein, said sleeve also being provided with an air inlet port communicating with said recess and having a valve seat formed thereon at the intersection of said recess and port, a movable valve member loosely mounted and guided within said recess and provided with a tapered portion adapted to rest upon said seat and close the said air port, a thumb screw having screw-threaded engagement with said casing and adapted to limit the movement of said movable valve member, the latter having a shouldered portion slidable in said screw and guided thereby, a check nut for said screw, and a screen within said casing and interposed between said fluid inlet passage and said movable valve member.

In testimony whereof I have hereunto set my hand.

EDWARD F. DONNELLY.